United States Patent [19]

Giles

[11] Patent Number: 4,550,793

[45] Date of Patent: Nov. 5, 1985

[54] METHOD AND APPARATUS FOR CHECKING THE WEIGHT OF A MOVING ARTICLE

[75] Inventor: Alan F. Giles, Welwyn Garden City, England

[73] Assignee: Precision Engineering Products Limited (Suffolk), Suffolk, England

[21] Appl. No.: 448,896

[22] PCT Filed: May 12, 1982

[86] PCT No.: PCT/GB82/00143

§ 371 Date: Dec. 7, 1982

§ 102(e) Date: Dec. 7, 1982

[87] PCT Pub. No.: WO82/04123

PCT Pub. Date: Nov. 25, 1982

[30] Foreign Application Priority Data

May 13, 1981 [GB] United Kingdom ............... 8114584

[51] Int. Cl.[4] ...................... G01G 19/00; G01G 21/22
[52] U.S. Cl. .................................. 177/145; 177/163; 198/504
[58] Field of Search .................. 177/3, 25, 163, 134, 177/204, 61; 1/119, 145; 198/504

[56] References Cited

U.S. PATENT DOCUMENTS

| 2,279,041 | 4/1942 | Hadley | 177/145 |
| 3,276,525 | 10/1966 | Cass | 177/163 |
| 3,674,097 | 7/1972 | Gile | 177/3 |

Primary Examiner—E. A. Goldberg
Assistant Examiner—M. Reinehart
Attorney, Agent, or Firm—Cushman, Darby & Cushman

[57] ABSTRACT

A method and apparatus for checking the weight of a moving article in which the article moves across a weigh platform connected to at least two load cells spaced apart via the direction of travel of the article, the output signals from the load cells being added to gether to provide a measure of the weight of the article when the center of gravity of the article is central of the load cells as indicated by the difference between the output signals being zero.

6 Claims, 7 Drawing Figures

METHOD AND APPARATUS FOR CHECKING THE WEIGHT OF A MOVING ARTICLE

This invention relates to weighing and particularly to a method and apparatus for checking the weight of a moving article. The weights of each of a succession of moving articles may be required to be checked for weight monitoring, weight recording, weight trend control of successively formed or filled articles, or the absence of one or more items from an article comprising a plurality of items. Check weighing apparatus for these and other purposes is commonly included in a conveyor system so that successive articles pass the check weighing apparatus. Some form of sensing device or a gating system has heretofore been necessary which senses the presence of an article in the correct position on the weighing platform of the check weighing apparatus to trigger the weighing mechanism and provide the desired indication of the weight of the article. Such indication in its simplest form can be a visual indication of the weight of the article or the deviation of the weight of the article from a predetermined nominal weight. Alternatively the indication can be used to operate a mechanism separating articles of various weights into groups, for controlling the forming or filling operation to adjust the weight of the article or in any other way as is required.

According to the present invention there is provided a method of checking the weight of a moving article comprising passing the article across a weigh platform connected to at least two load cells spaced apart in the direction of travel of the article, sensing the output signals from the load cells and adding together the output signals to provide a measure of the weight of the article when the output signals from each of the load cells are equal. The correct positioning of the article on the weigh platform for the weighing to the article to be effected is thus determined by the load cells themselves and no additional means is required. A great advantage of this is that whereas previous methods of determining the correct positioning of the article for weighing have depended upon the dimensions of the article, eg when the position is sensed by photocells, the method of the present invention relies only in the position of the centre of gravity of the article. Thus the method can be used for checking the weights of articles of different dimensions without the necessity of resetting any sensing means. Furthermore the method of the present invention can be used for checking the weight of a succession of articles of different dimensions and even of different weights.

Preferably the weigh platform is connected to two load cells, the output signals of which are subtracted one from the other and the output signals summed together to provide a measure of the weight of the article when the result of the subtraction is zero.

The article can be passed across the weigh platform under the influence of gravity. Thus the necessity for any mechanical, electrical or other positive acting driving means for the article as it passes the weigh platform is avoided together with the attendant risks of mechanical failure or breakdown. This is particularly advantageous when the method is employed in a continuous manufacturing process which would be interrupted by the check weighing system becoming inoperative.

The invention also provides apparatus for checking the weight of a moving article comprising a weigh platform, the weigh platform being operatively connected to at least two load cells spaced apart in the direction of travel of the article, equating means for receiving the individual output signals from the load cells and determining when each of the load cells are subject to an equal weight, and summing means for providing a measure of the sum of the output signals when said signals are equal which measure is a measure of the weight of the article.

The apparatus according to the invention preferably comprises two load cells, the equating means subtracting one of the signals from the other, the summing means providing a measure of the weight of the article when the result from the equating means is zero. The load cells can be of the slotted beam type having strain gauges mounted within the slot. Such load cells are one type of load cell to which the weigh platform can be connected and the weigh platform supported thereby without the necessity for any additional supporting means or means for restraining unwanted movements of the weigh platform.

The means for moving the article across the weigh platform can comprise inclining the platform to the horizontal in the direction of travel. Thus the article will pass across the platform under the influence of gravity which can be assisted by providing the upper surface of the platform with a plurality of freely rotatable rollers on which the article travels. It has been found that 6 degrees is a particularly effective angle of inclination with such an arrangement.

The invention will now be more particularly described with reference to the accompanying diagrammatic drawings in which FIG. 1 is a side elevation of a check weighing apparatus according to the invention;

Figure 1:
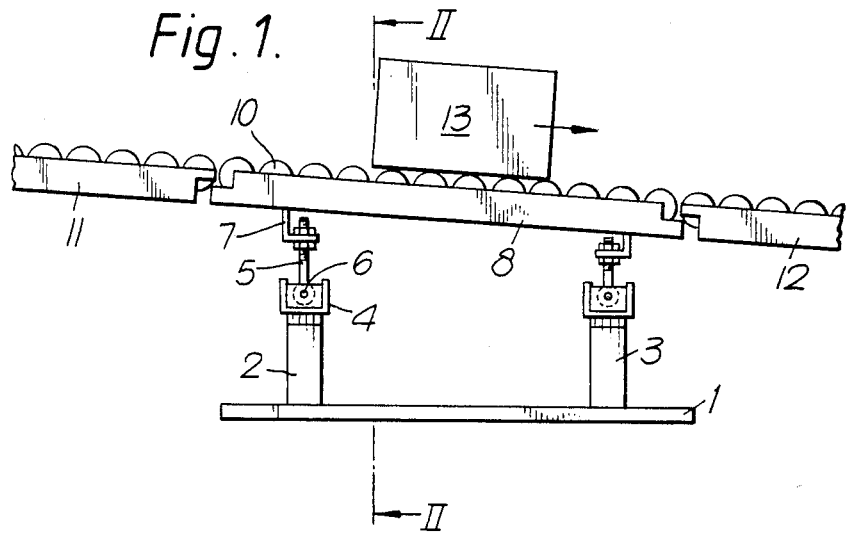
Figure 2:
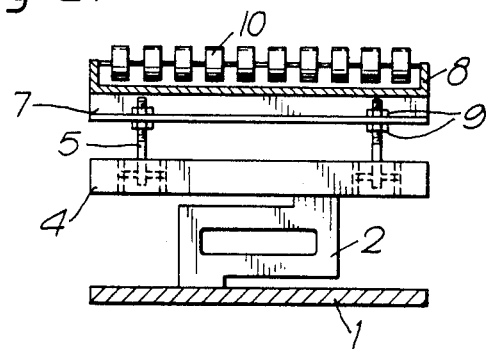
FIG. 2 is a sectional elevation in the direction of arrows II—II in FIG. 1.

Referring to FIG. 1 the check weighing apparatus comprises a base member 1 on which are mounted two load cells 2 and 3 of the slotted beam cantilever type. Each of the load cells is provided with a support member 4 of 'U' shaped cross section which each carry the lower ends of two support arms 5 connected to the support member 4 by pins 6. The upper ends of the support arms 5 are threaded and pass through holes in platform members 7 connected to platform side members 8. The effective lengths of the support arms is adjustable by nuts 9 which also serve to lock the platform the the support pins. Carried between the platform side members 8 are a plurality of freely rotatable rollers 10. It will be appreciated that adjustment of the effective length of the support arms provides a convenient way of obtaining the desired inclination of the platform and/or adjusting the height of the platform relative to conveyors 11, 12 on either side of the platform. As shown in FIG. 1 the weigh platform is inclined at 6° to the horizontal in the direction of travel of articles from the conveyor 11 to the conveyor 12.

Figure 3:
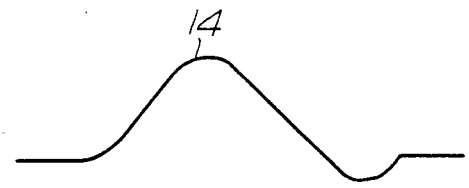
FIG. 3 is a diagram showing the output signal from one of the load cells.
Figure 4:
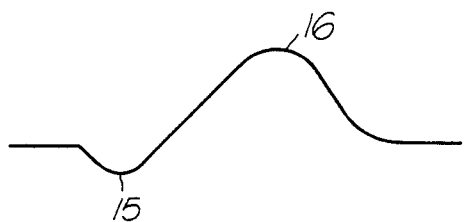
FIG. 4 is a diagram showing the output signal from the other load cell.
Figure 5:
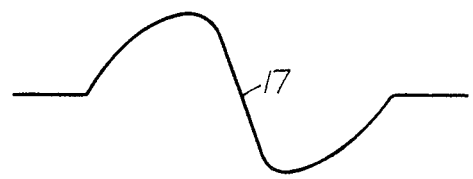
FIG. 5 shows the signal of FIG. 4 subtracted from the signal of FIG. 3.
Figure 6:
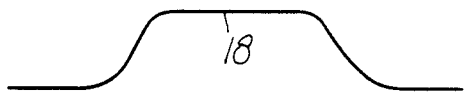
FIG. 6 shows the sum of the signals of FIGS. 3 and 4.

As an article 13 to be weighed passes from conveyor 11 across the weigh platform to the conveyor 12 the output signal from the first load cell 2 will be as shown in FIG. 3 and the output signal from the second load cell 3 will be shown in FIG. 4. As the leading edge of the article 13 passes onto the weigh platform the output from the load cell 2 rises to a peak value 14. After an initial drop at 15 the output from the load cell 3 also rises to a peak 16. When the output signals from both the load cells 2 and 3 are the same, ie indicating that the article is positioned with its centre of gravity midway between the load cells 2 and 3, the value of the difference between the two output signals is zero as shown at 17 in FIG. 5. At this point in the travel of the article across the weigh platform the sum of the two output signals corresponds to the weight of the article and this value is shown at 18 in FIG. 6 and is taken as a measure of the weight of the article.

Figure 7:
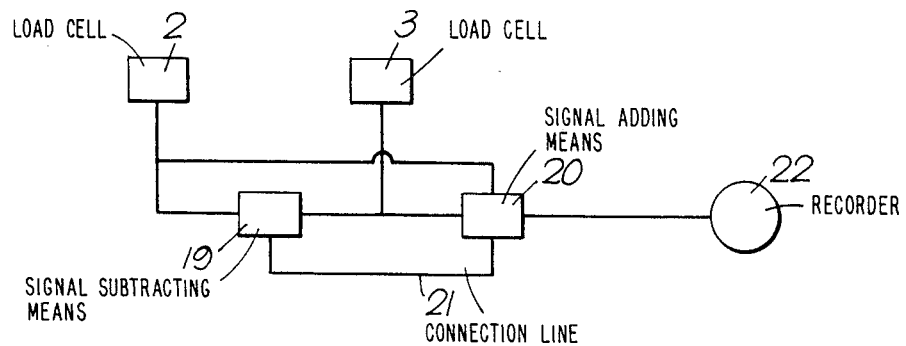
FIG. 7 is a block diagram showing a system for processing the signals.

Thus referring to FIG. 7 the output signals from the load cells are fed to means 19 for subtracting the signals from one another and the means 20 for adding the two signals together. When the difference as sensed by means 19 is zero the means 19 signals the means 20 along connection line 21 to transmit the sum of the two signals to the desired form of indicator or recorder 22.

In this way an accurate measure of the weight of an article is obtained in which the outputs from load cells are used not only to give a measure of the weight of the article but also to detect when the article is correctly positioned for the weighing to be effected. This system of detecting the position of the article does not rely upon the dimensions of the article, nor does the article have to be symmetrical with the centre of gravity at the geometric centre of the article. Variations of this kind do not affect the accuracy of the weighing and the system is thus suited to the weighing of articles of random size and weight.

If desired a system of article recognition can be provided upstream of the checkweigher to feed a nominal weight of the article to the indicator or recorder 22 which can therefore be arranged to give a measure of variation of the actual weight of the article from the nominal weight.

Whilst the checkweigher as described and illustrated has the weigh platform inclined to provide the means for moving the article across the platform, the platform can of course be horizontal and be provided with other means such as driven belts or pushers for pushing the articles.

I claim:

1. A method of checking the weight of a moving article comprising passing the article across a weigh platform connected to at least two load cells spaced apart in the direction of travel of the article, sensing the output signals from the load cells, equating the output signals from each of the load cells to determine when the output signals from the load cells are equal and the article is correctly positioned on the platform for weighing, and adding together the output signals from the load cells when they are equal to provide a measure of the weight of the article and indicating only that measure of the sum of the output signals.

2. A method according to claim 1 in which the weigh platform is connected to two load cells, characterised in that the output signals of the load cells are subtracted one from the other and the output signals summed together to provide a measure of the weight of the article when the result of the subtraction is zero.

3. A method according to claim 1 or claim 2 characterised in that the article is passed across the weigh platform under the influence of gravity.

4. Apparatus for checking the weight of a moving article comprising a weigh platform, the weigh platform being operatively connected to at least two load cells which provide output sensing signals and which are spaced apart in the direction of travel of the article, means for equating the output signals from each of the load cells to determine when the output signals from the load cells are equal and the article is correctly positioned on the platform for weighing, and adding together the output signals from the load cells when they are equal to provide a measure of the weight of the article and indicating only that measure of the sum of the output signals.

5. Apparatus according to claim 4 having two load cells, characterized in that the equating means subtracts one of the signals from the other, the summing means providing a measure of the weight of the article when the result from the equating means is zero.

6. Apparatus according to claims 4 or 5, characterised in that the weigh platform is inclined to the horizontal, in the direction of travel of the article.

* * * * *